United States Patent Office 2,814,561
Patented Nov. 26, 1957

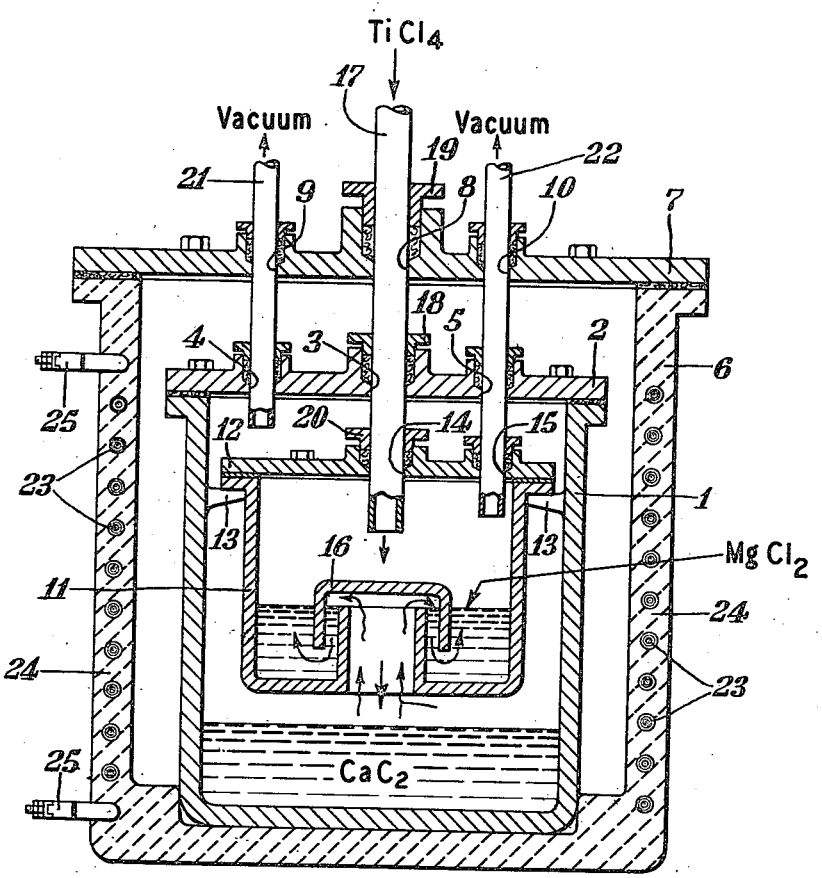

2,814,561

PROCESS AND APPARATUS FOR REDUCING METAL CHLORIDES EMPLOYING CALCIUM CARBIDE

Hendrik de Wet Erasmus, Lewiston, N. Y., assignor to Union Carbide Corporation, a corporation of New York Application February 26, 1953, Serial No. 339,097

4 Claims. (Cl. 75—84.5)

This invention relates to a process and apparatus for recovering metals by the indirect reduction of metal chlorides.

It has long been known that calcium carbide is a cheap and potent reducing agent for metal chlorides. This use of calcium carbide has, however, been limited by the lime content of commercial calcium carbide and by the carbon generated in its reaction with chlorides. As a result it has only proven feasible to use calcium carbide to reduce the chlorides of metals which form unstable carbides and have a sufficiently high vapor pressure to make them removable from the reaction zone without the concurrent removal of undesirable impurities. Calcium carbide can be used for the direct reduction of chlorides of sodium and magnesium, but, because of these limitations, it cannot be used for the direct reduction of the chlorides of most other metals, such as the chlorides of titanium, zirconium and aluminum.

It is, therefore, an object of the present invention to provide a novel process employing calcium carbide for the reduction of chlorides of metals which form stable carbides or have vapor pressures too low to permit their recovery by direct reduction with calcium carbide.

A further object is to provide novel apparatus for performing the process of the present invention.

Other aims and advantages of the present invention will be apparent from the following description and appended claims.

According to the present invention a process is provided by which this desirably potent and cheap reducing agent, calcium carbide, can be employed in the reduction of metal chlorides by the use of a volatile intermediate reducing agent.

In this process the chloride of an easily volatilizable metal which does not form a stable carbide, such as sodium or magnesium, or a mixture of such chlorides, is reacted in a first reaction zone with a substantial excess of commercial calcium carbide to produce the easily volatilizable metal in the vapor phase. As these metal vapors are generated they pass into a second reaction zone into which the chloride of the metal to be reduced is fed simultaneously. In this reaction zone solid metal is formed together with a liquid chloride or chlorides of the intermediate reducing agent or agents. The latter chloride or chlorides then pass from the second reaction zone back to the first reaction zone for the generation of more intermediate reducing agent. This cyclic operation is continued until the supply of calcium carbide is exhausted.

A detailed illustration of the cyclic process of the present invention, wherein titanium tetrachloride is employed as the metal chloride and magnesium as the intermediate regenerated reducing agent, is as follows:

Initially, molten magnesium chloride is reacted with an excess of calcium carbide under temperature and pressure conditions which result in the production of magnesium metal in the vapor phase. The magnesium vapors so generated are passed into a zone into which titanium tetrachloride is simultaneously fed. The resulting products of this reaction are a spongy titanium metal and magnesium chloride in the liquid phase. This magnesium chloride is then fed back to the first reaction zone where its reaction with calcium carbide will result in the regeneration of magnesium vapor. A cyclic process is thereby provided wherein magnesium is, in effect, the intermediate reducing agent and calcium, in the form of calcium carbide, acts as the ultimate reducing agent. This regeneration and recycling of magnesium vapor, through the use of calcium carbide as the ultimate reducing agent consumed by the process, eliminates the consumption of large quantities of costly pure magnesium metal.

The titanium metal produced according to the process of the present invention is in a spongy form which may be easily removed from the system.

An example setting forth quantitatively the constituents and products for one complete cycle of the process of this invention is as follows:

Magnesium chloride salt was heated to a temperature of approximately 700–900° C., whereupon the salt melted. This molten salt was then reacted, at the same temperature and at a pressure below the corresponding vapor pressure of magnesium at that temperature, with a quantity of calcium carbide in excess of the amount stoichiometrically required to react to completion with the magnesium chloride to yield magnesium. The resulting magnesium, a vapor under the reaction conditions, was reacted with titanium tetrachloride vapor. This vapor phase reaction yielded a spongy titanium metal product and magnesium chloride which was then reacted with more calcium carbide to sustain cyclic operation. This cyclic process was performed for 2 hours, under the temperature and pressure conditions hereinabove specified, using 5.2 parts of magnesium metal in the form of magnesium chloride and 30 parts of $1/8''$ x $1/2''$ mesh calcium carbide. 38.2 parts of titanium tetrachloride in the vapor phase was fed into the process and 2 parts of titanium sponge was recovered.

The process of the present invention may be successfully employed to reduce chlorides of titanium, zirconium, vanadium, hafnium, niobium, and tantalum.

The process may be effectively performed in an apparatus similar to that shown in front sectional view in the drawing.

As there shown, a steel vessel 1 having a removable steel cover 2, provided with entry ports 3, 4 and 5, is located in a resistor-heated vacuum furnace 6 having a detachable cover 7 provided with entry ports 8, 9 and 10. A steel reaction vessel 11 having a cover 12 is suspended inside and near the top of vessel 1 by suitable means, such as a plurality of supporting brackets 13. Cover 12 is provided with entry ports 14 and 15. Reaction vessel 11 is provided with one or more bubble caps 16 in its base. An intake pipe 17 passes successively through entry port 8 of furnace cover 7, entry port 3 of vessel cover 2, and entry port 14 of vessel cover 12. Packings 18, 19 and 20 of vessel cover 2, furnace cover 7, and vessel cover 12, respectively, provide for a seal between each side of the covers. Vacuum tube 21 passes through furnace cover inlet port 9 and inlet port 4 of vessel cover 2 thereby maintaining the interior of vessel 1 at the desired vacuum. Similarly, vacuum tube 22 passes through furnace cover inlet port 10, inlet port 5 of vessel cover 2, and inlet port 15 of vessel cover 12 thereby maintaining the interior of vessel 11 at the desired vacuum.

In operation, calcium carbide is placed in the bottom of steel vessel 1 and magnesium chloride and/or sodium chloride crystals are placed in the bottom of reaction vessel 11, around bubble cap 16. The chloride of the metal to be reduced is fed into reaction vessel 11 through intake pipe 17. A partial vacuum is maintained within reaction vessel 11 and steel vessel 1 by means of a vacuum pump connected through vacuum pipes 22 and 21, respectively. Furnace resistance windings 23 are embedded in the side walls 24 of furnace 6 and are connected to a source of alternating current power through leads 25.

As the temperature within vessel 11 reaches the melting point of the magnesium chloride crystals, fusion takes place and liquid magnesium chloride passes through the bubble cap 16 to the calcium carbide below. There the magnesium chloride is reduced by the calcium carbide and calcium chloride and carbon are formed together with metallic magnesium in vapor phase. The magnesium vapor, thus generated, passes up through bubble cap 16 and the molten magnesium chloride and reacts with the chloride of the metal to be reduced. The products of this reaction are the reduced metal and magnesium chloride which passes to the bottom of reaction vessel 11 and adds to the supply of magnesium chloride which will cause a further quantity to pass through the bubble cap and react with a further quantity of calcium carbide to generate magnesium vapor.

When employing apparatus such as shown in the drawing it is preferable to provide means for agitating the supply of calcium carbide to insure that the calcium chloride and carbon formed when magnesium chloride is reduced, do not blanket the further supply of calcium carbide and isolate it from further reacting with the magnesium chloride continuously being generated in reaction vessel 11, thereby interrupting cyclic operation.

The use of an apparatus, such as is shown in the drawing and described hereinabove, provides for the operation of the process of the present invention in a most efficient and compact manner. The entire cycle is contained within the furnace and this cyclic process can be continuously run for long periods of time until calcium carbide depletion and corresponding calcium chloride buildup require furnace shutdown and the insertion of a new charge.

After the furnace has been shut down and has sufficiently cooled the titanium sponge can be removed from the reaction chamber and processed. This processing entails heating of the metallic sponge to remove residual chlorides by vacuum distillation and then fusion of the powder so obtained.

What is claimed is:

1. Apparatus for the cyclic reductions of chlorides of metals comprising, a closed electric vacuum furnace; a first closed reaction vessel positioned therein; a second closed reaction vessel having bubble cap means for providing for liquid and gas communication between said first and said second closed reaction vessels, said second closed reaction vessel positioned within said first closed reaction vessel and suspended above the lower end thereof to form a space therebetween; entry means for conveying the chloride of the metal to be reduced from an external source through the cover of said vacuum furnace and said first closed reaction vessel into the upper end of said second closed reaction vessel; and means associated with said electric furnace for maintaining the interior of said first and second closed reaction vessels at the desired vacuum conditions.

2. In a cyclic process for the ultimate reduction of chlorides of at least one product metal selected from the group consisting of titanium, zirconium, vanadium, hafnium, niobium, and tantalum, wherein a closed vacuum furnace, a first closed reaction vessel positioned therein, a second closed reaction vessel having bubble cap means for providing for liquid and gas communication between said first and said second closed reaction vessel, said second closed reaction vessel positioned within said first closed reaction vessel and suspended above the lower end thereof to form a space therebetween, and entry means for conveying the chloride of the product metal to be reduced from an external source through the cover of said vacuum furnace and said first closed reaction vessel into the upper end of second closed reaction vessel are provided, the steps of introducing at the lower end of said second closed reaction vessel a quantity of the chloride of at least one reducer metal selected from the group consisting of sodium and magnesium, introducing in the space between the lower end of said second closed reaction vessel and the lower end of said first closed reaction vessel a quantity of calcium carbide, passing through said entry means a quantity of the chloride of said product metal to be reduced, and maintaining the interior of said first and second reaction vessels at a temperature and pressure suitable for maintaining said reducer metal in the vapor phase to form in said second closed reaction vessel the product metal of the metal chloride to be reduced and the chloride of said reducer metal, and causing said as-formed chloride of said reducer metal to pass into said first reaction vessel to react with a further quantity of calcium carbide and generate a further quantity of reducer metal in the vapor phase.

3. A process in accordance with claim 2 wherein magnesium is employed as said selected reducer metal.

4. A process in accordance with claim 2 wherein said selected product metal chloride is titanium chloride.

References Cited in the file of this patent

UNITED STATES PATENTS

| 80,192 | Lloyd | July 21, 1868 |
| 1,306,568 | Weintraub | June 10, 1919 |
| 1,872,611 | Thurm | Aug. 16, 1932 |
| 2,238,909 | McConica et al. | Apr. 22, 1941 |
| 2,310,188 | Hansgirg | Feb. 2, 1943 |
| 2,349,927 | Arimori | May 30, 1944 |
| 2,564,337 | Maddex | Aug. 14, 1951 |

FOREIGN PATENTS

| 296,867 | Germany | Mar. 13, 1917 |
| 464,519 | Great Britain | Aug. 20, 1937 |
| 505,801 | Belgium | Sept. 29, 1951 |

OTHER REFERENCES

Bureau of Mines R. I. 4059 by Michels et al., March 1947. Entire report consists of 8 pages and cover. Published by Bur. of Mines, D. C.

Metals Transactions, vol. 185, September 1949. Pages 553–560.

Australasian Inst. of Mining and Metallurgy, Proceedings . . . New Series No. 159–9, published 1950, pages 76–80. "Extraction of Titanium," by Worner et al.